US008762448B2

(12) United States Patent
Kumar et al.

(10) Patent No.: US 8,762,448 B2
(45) Date of Patent: Jun. 24, 2014

(54) IMPLEMENTING ASYNCHRONOUS PROCESSES ON A MOBILE CLIENT

(75) Inventors: Darshan Kumar, San Ramon, CA (US);
Ambili Sudhi, Bangalore (IN);
Govindraja Achar, Bangalore (IN);
Pankesh Jhaveri, North Brunswick, NJ (US); Harish Kumar, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 338 days.

(21) Appl. No.: 12/363,371

(22) Filed: Jan. 30, 2009

(65) Prior Publication Data

US 2010/0198908 A1 Aug. 5, 2010

(51) Int. Cl.
*G06F 15/16* (2006.01)
*G06F 9/46* (2006.01)

(52) U.S. Cl.
USPC ............................................ 709/203; 718/102

(58) Field of Classification Search
USPC .......................... 709/203–207; 718/100–108; 719/313–317, 328
See application file for complete search history.

(56) References Cited

U.S. PATENT DOCUMENTS

| | | | |
|---|---|---|---|
| 6,055,507 A | 4/2000 | Cunningham | |
| 6,161,176 A | 12/2000 | Hunter et al. | |
| 6,188,401 B1 | 2/2001 | Peyer | |
| 6,229,537 B1 | 5/2001 | Sobeski et al. | |
| 6,430,591 B1 * | 8/2002 | Goddard | 718/102 |
| 6,453,302 B1 | 9/2002 | Johnson et al. | |
| 6,523,102 B1 * | 2/2003 | Dye et al. | 711/170 |
| 6,542,595 B1 | 4/2003 | Hemzal | |
| 6,624,831 B1 | 9/2003 | Shahine et al. | |
| 6,630,946 B2 | 10/2003 | Elliott et al. | |
| 6,636,863 B1 | 10/2003 | Friesen | |
| 6,683,943 B2 | 1/2004 | Wuelly | |
| 6,859,780 B1 | 2/2005 | Cunningham | |
| 6,944,829 B2 | 9/2005 | Dando et al. | |
| 6,952,681 B2 | 10/2005 | McQuade et al. | |
| 6,963,826 B2 | 11/2005 | Hanaman et al. | |
| 6,990,454 B2 | 1/2006 | McIntosh | |
| 6,996,569 B1 | 2/2006 | Bedell et al. | |
| 7,058,890 B2 | 6/2006 | George et al. | |
| 7,107,548 B2 | 9/2006 | Shafron | |
| 7,179,751 B2 * | 2/2007 | Smith et al. | 438/725 |
| 7,219,127 B2 * | 5/2007 | Huck et al. | 709/204 |
| 7,222,305 B2 * | 5/2007 | Teplov et al. | 715/751 |
| 7,240,070 B1 | 7/2007 | Man Cheng et al. | |
| 7,243,336 B2 | 7/2007 | Brockway et al. | |
| 7,249,053 B2 | 7/2007 | Wohlers et al. | |

(Continued)

OTHER PUBLICATIONS

U.S. Appl. No. 12/363,385, Darshan Kumar.

(Continued)

*Primary Examiner* — Chirag R Patel
(74) *Attorney, Agent, or Firm* — Miles & Stockbridge P.C.

(57) ABSTRACT

Systems and methods are provided perform an asynchronous process in a mobile client when not connected to an enterprise server. An application on a mobile client receives a request from a user to perform a task that is ordinarily performed by the enterprise server, such as decompressing a large data file. The mobile client determines, however, that it is not connected to the enterprise server. Instead, the application spawns a thread to complete the task asynchronously. Accordingly, the task need not be performed synchronously, thus making the user wait, when the mobile client is disconnected from the enterprise server.

15 Claims, 6 Drawing Sheets

(56) References Cited

U.S. PATENT DOCUMENTS

| | | | |
|---|---|---|---|
| 7,406,534 B2 | 7/2008 | Syvanne et al. | |
| 7,467,355 B1 | 12/2008 | Zukowski et al. | |
| 7,590,939 B2 | 9/2009 | Sareen et al. | |
| 7,679,637 B1 | 3/2010 | Kohler | |
| 7,707,513 B2 | 4/2010 | Broda et al. | |
| 7,805,334 B1 | 9/2010 | Huppert | |
| 7,827,481 B1 | 11/2010 | Greenfield et al. | |
| 7,956,869 B1 | 6/2011 | Gilgra | |
| 2001/0044731 A1 | 11/2001 | Coffman et al. | |
| 2002/0032501 A1 | 3/2002 | Tilles et al. | |
| 2002/0032582 A1 | 3/2002 | Feeney et al. | |
| 2002/0065683 A1 | 5/2002 | Pham et al. | |
| 2002/0169795 A1 | 11/2002 | Elliott et al. | |
| 2002/0173990 A1 | 11/2002 | Marasco | |
| 2002/0188513 A1 | 12/2002 | Gil et al. | |
| 2003/0004840 A1 | 1/2003 | Gharavy | |
| 2003/0040953 A1 | 2/2003 | Kasler et al. | |
| 2003/0055713 A1 | 3/2003 | Pinto et al. | |
| 2003/0066032 A1 | 4/2003 | Ramachandran et al. | |
| 2003/0088442 A1 | 5/2003 | Michael et al. | |
| 2003/0123631 A1 | 7/2003 | Moss et al. | |
| 2003/0144857 A1 | 7/2003 | Lacour et al. | |
| 2003/0158947 A1 | 8/2003 | Bloch et al. | |
| 2003/0197366 A1 | 10/2003 | Kusterbeck | |
| 2003/0226111 A1 | 12/2003 | Wirts et al. | |
| 2004/0024740 A1 | 2/2004 | McGeorge | |
| 2004/0056894 A1 | 3/2004 | Zaika et al. | |
| 2004/0113934 A1 | 6/2004 | Kleinman et al. | |
| 2004/0138965 A1 | 7/2004 | Laughlin et al. | |
| 2004/0141004 A1 | 7/2004 | Cabezas et al. | |
| 2004/0141016 A1 | 7/2004 | Fukatsu et al. | |
| 2004/0187127 A1 | 9/2004 | Gondi et al. | |
| 2004/0205343 A1 | 10/2004 | Forth et al. | |
| 2004/0225528 A1 | 11/2004 | Brock | |
| 2004/0255232 A1 | 12/2004 | Hammond et al. | |
| 2005/0039139 A1 | 2/2005 | Schwartz et al. | |
| 2005/0065756 A1 | 3/2005 | Hanaman et al. | |
| 2005/0102192 A1 | 5/2005 | Gerrits et al. | |
| 2005/0108044 A1 | 5/2005 | Koster | |
| 2005/0108295 A1 | 5/2005 | Karimisetty et al. | |
| 2005/0125806 A1 | 6/2005 | Bussler et al. | |
| 2006/0010397 A1 | 1/2006 | Laffey | |
| 2006/0016876 A1 | 1/2006 | Bonalle et al. | |
| 2006/0069785 A1 | 3/2006 | Barrett | |
| 2006/0074775 A1 | 4/2006 | Roman et al. | |
| 2006/0085449 A1 | 4/2006 | Sattler et al. | |
| 2006/0122971 A1 | 6/2006 | Berg et al. | |
| 2006/0129432 A1 | 6/2006 | Choi et al. | |
| 2006/0136843 A1 | 6/2006 | Shafron | |
| 2006/0190809 A1 | 8/2006 | Hejna, Jr. | |
| 2006/0247968 A1 | 11/2006 | Kadry | |
| 2006/0293930 A1 | 12/2006 | Rodgers et al. | |
| 2006/0294468 A1 | 12/2006 | Sareen et al. | |
| 2007/0186167 A1 | 8/2007 | Anderson | |
| 2007/0192192 A1 | 8/2007 | Haberman et al. | |
| 2007/0192410 A1 | 8/2007 | Liversidge et al. | |
| 2007/0203785 A1 | 8/2007 | Thompson et al. | |
| 2007/0203851 A1 | 8/2007 | Sudhi | |
| 2007/0220039 A1 | 9/2007 | Waldman et al. | |
| 2007/0226027 A1 | 9/2007 | Chang | |
| 2007/0226082 A1 | 9/2007 | Leal | |
| 2007/0283287 A1 | 12/2007 | Taylor et al. | |
| 2007/0294612 A1 | 12/2007 | Drucker et al. | |
| 2008/0075251 A1 | 3/2008 | Jefferson et al. | |
| 2008/0103821 A1 | 5/2008 | Cerbone et al. | |
| 2008/0103856 A1 | 5/2008 | Ciszkowski et al. | |
| 2008/0109286 A1 | 5/2008 | Johnson et al. | |
| 2008/0114709 A1 | 5/2008 | Dixon et al. | |
| 2008/0126179 A1 | 5/2008 | Norfolk et al. | |
| 2008/0134077 A1 | 6/2008 | Cheng et al. | |
| 2008/0140449 A1 | 6/2008 | Hayes | |
| 2008/0172603 A1 | 7/2008 | Agarwal et al. | |
| 2008/0184157 A1 | 7/2008 | Selig | |
| 2008/0195504 A1 | 8/2008 | Wren | |
| 2008/0250433 A1* | 10/2008 | Orton et al. | 719/328 |
| 2008/0255886 A1 | 10/2008 | Unkefer et al. | |
| 2008/0271059 A1* | 10/2008 | Ott et al. | 719/328 |
| 2008/0320509 A1 | 12/2008 | Gustafson et al. | |
| 2009/0024647 A1 | 1/2009 | Hein | |
| 2009/0077170 A1 | 3/2009 | Milburn et al. | |
| 2009/0125850 A1 | 5/2009 | Karstens | |
| 2009/0125907 A1* | 5/2009 | Wen et al. | 718/101 |
| 2009/0172564 A1 | 7/2009 | Fish | |
| 2009/0210796 A1 | 8/2009 | Bhogal et al. | |
| 2009/0248646 A1 | 10/2009 | Probst et al. | |
| 2009/0254828 A1 | 10/2009 | Denoue et al. | |
| 2009/0265255 A1 | 10/2009 | Jackson et al. | |
| 2009/0305217 A1 | 12/2009 | Mulcahy et al. | |
| 2009/0327934 A1 | 12/2009 | Serpico et al. | |
| 2010/0037168 A1 | 2/2010 | Thayne et al. | |
| 2010/0049699 A1 | 2/2010 | Benschoter et al. | |
| 2010/0114985 A1 | 5/2010 | Chaudhary et al. | |
| 2010/0151846 A1 | 6/2010 | Vuong | |
| 2010/0161713 A1 | 6/2010 | Gangadharappa et al. | |
| 2010/0332227 A1 | 12/2010 | Melamed et al. | |

OTHER PUBLICATIONS

U.S. Appl. No. 12/362,409, Darshan Kumar.
U.S. Appl. No. 12/363,402, Darshan Kumar.
U.S. Appl. No. 12/363,517, Darshan Kumar.
U.S. Appl. No. 12/362,398, Darshan Kumar.
U.S. Appl. No. 12/362,406, Darshan Kumar.
U.S. Appl. No. 12/363,411, Darshan Kumar.
U.S. Appl. No. 12/362,416, Darshan Kumar.
Oracle, "Siebel Mobile Solutions," Oracel Data Sheet, 2007, pp. 1-4.
"Boehringer Inglhein Holland Experiences Significant Increase in Customer Satisfaction in 12 Months Using Siebel Pharma", Business Wire, NY p. 1, Mar. 2004.
"Business Update; CSSC Completes Siebel Systems Validations for Three Pharmaceutical Firms", Health and Medicine Week, Atlanta, p. 346, May 25, 2006.
"Demantra Introduces Demantra Suite 4.0—Software That Offers Ten Times Return on Investment by Managing Product Demand"; Business Wire, NY, p. 1, Apr. 2, 2001.
"iAnywhere Prescribes Mobile Technology to Eli Lily's Italian Sales Team", PR Newswire, NY, p. 1, Mar. 22, 2004.
"Novo Nordisk Expands Siebel Pharma Deployment to Optimize European Sales Effectiveness", Business Wire, NY, p. 1, May 2003.
Oracle Licenses CIC's of eSignature Technology for Siebel Handheld for Pharma and Siebel Handheld for Service, PR Newswire, NY, Jan. 9, 2007.
Phoenix Territory Management System, incorporated by reference into Cerbone et al., U.S. Patent Application Publication No. 2008/0103821, publication date May 1, 2008.
Siebel Life Sciences Guide, Version 7.8, Rev. A Sep. 2005 pp. 1-108 http://www.erp100.com/document/Siebel/Version7.8/B31104_01/books/PDF/LSSIA.pdf.
Siebel Pharma Dynamic Sales for Pharmaceutical Biotechnology Companies, An Oracle White Paper, Customer Relationship Management and Business Analytics, Jun. 2006 http://www.oracle.com/industries/life-sciences/042929.pdf.
Siebel Pharma Handheld Guide, Version 7-7, Siebel Systems, Jun. 2004.
Siebel Pharma Handheld Guide, Version 7-8, May 2005 http://download.oracle.com/docs/cd/B31104_02/books/PDF/HHPharm.pdf.
Siebel Systems Inc., Siebel Enterprise Applications, Siebel Interactive Guide, Siebel 99, Version 5-5, 10PA1-A101-05500, Jun. 1999.
Siebel Life Sciences Guide, Version 7.8, Rev. A Sep. 2005 pp. 109-230 http://www.erp100.com/document/Siebel/Version7.8/B31104_01/books/PDF/LSSIA.pdf.
Siebel Life Sciences Guide, Version 7.8, Rev. A Sep. 2005 pp. 231-358 http://www.erp100.com/document/Siebel/Version7.8/B31104_01/books/PDF/LSSIA.pdf.
Siebel Life Sciences Guide, Version 7.8, Rev. A Sep. 2005 pp. 359-464 http://www.erp100.com/document/Siebel/Version7.8/B31104_01/books/PDF/LSSIA.pdf.
Oracle Quality Implementation Guide, Release 12, Part No. B31579-01, Dec. 2006 http://docs.oracle.com/cd/B34956_01/current/acrobat/120qaig.pdf.

(56) References Cited

OTHER PUBLICATIONS

Kunau ("Enterprise Architecture, Life Sciences, and Visualization", Oct. 4, 2006, http://kunau.us/general-interest/design/macromedia-flex-as-an-interface-builder-for-life-sciences-applications/).
"The Telemarketing Sales Rule", Published by Consumers a Helpful Guide on Sep. 1, 2005, pp. 1 and 2.
"Data Services Made Easy for Adobe Flex Applications", Flex Developer Boot Camp Sep. 23, 2007, Santa Clara, CA., pp. 1-9.
U.S. Office Action, U.S. Appl. No. 12/363,411, dated Mar. 31, 2011.
Oracle Siebel Life Sciences Guide, Version 7.7, Rev. C, Jun. 2007.
Oracle Siebel Life Sciences Guide, Version 7.8, Rev. C, May 2008.
Oracle Siebel Pharma Handheld Guide, Version 8.0, Rev. A, May 2007.
Oracle Data Sheet, "Siebel Mobile Solutions," Copyright 2007.
Oracle White Paper, "Oracle CRM for Life Sciences—Closed Loop Marketing Solution for the Pharmaceutical Sales Model," Copyright 2009.
Oracle White Paper, "Siebel Pharma Dynamic Sales Solution," Copyright 2006.
U.S. Office Action U.S. Appl. No. 12/362,406 dated Mar. 21, 2011.

\* cited by examiner

Figure 5

IMPLEMENTING ASYNCHRONOUS PROCESSES ON A MOBILE CLIENT

FIELD OF THE INVENTION

One embodiment is directed to customer relationship management ("CRM"), and more particularly directed to a mobile client operating a CRM application.

BACKGROUND INFORMATION

In recent years, the annual rate of increase among physicians has remained relatively flat while the number of pharmaceutical sales representatives has grown considerably overall, even accounting for recent reductions in field force sizes. As a result, sales call effectiveness has waned in the face of a changing market and physicians' increasingly busy schedules, forcing life sciences organizations to transform their sales and marketing capabilities. Pharmaceutical companies face stiff challenges in terms of completion, cost escalation and reduction in margins, while promoting their products by sending out sales representatives to doctors, hospitals and other medical organizations. Typically the sales representatives, in the few minutes that they get with the audience/ doctors, orally explain the complicated details of the medical product and then give handouts, such as presentation material on the product in paper form. A very likely result of such an approach is that after the session the audience would have already forgotten much, depending on the oral presentation skills of the representative, and the handouts will most likely be thrown away. A more effective approach would be to provide the sales representative with an animated presentation that would be more engaging for the little time allotted to the presentation. The sales representative could give the presentation on a mobile client such as a tablet personal computer ("PC").

However, the mobile thin client may need to perform computationally intense tasks such a decompressing large data files. Such tasks should be carried out asynchronously, allowing the user to continue with other tasks, while the background process performs the required decompression. Typically the server is required to start the asynchronous process, and since a mobile client does not have the server running, the creation of an asynchronous process is not possible. In this case, the decompression must take place synchronously, and the user must wait until the process is complete to use the mobile client again.

SUMMARY OF THE INVENTION

One embodiment is a system for performing an asynchronous process in a mobile client when not connected to an enterprise server. The system receives a request to perform a task ordinarily performed by the enterprise server. The system determines, however, that the mobile client is not connected to the enterprise server. The system instead spawns a thread from a base application to complete the task asynchronously. The base application receives a notification that the task was completed by the thread.

DETAILED DESCRIPTION

Systems and methods are provided that generate an asynchronous process locally using a thread spawned on a mobile client. Typically, to perform an asynchronous process as part of an enterprise application system ("EAS") such as a customer relationship management ("CRM") system, application code creates and invokes a job on an enterprise server in the EAS to create a new thread to perform the asynchronous process. However, to do this the server needs to be connected and running. Instead, a mobile client (e.g., a personalized content delivery ("PCD") system as described below) creates a new thread itself in a manner that does not require the server to be connected or running. The mobile client utilizes a core Operating System Dependent ("OSD") class function OSD-CreateThread that would create a separate thread to execute the asynchronous task. As a parameter it takes the function name from which the thread would start its execution.

Figure 1:
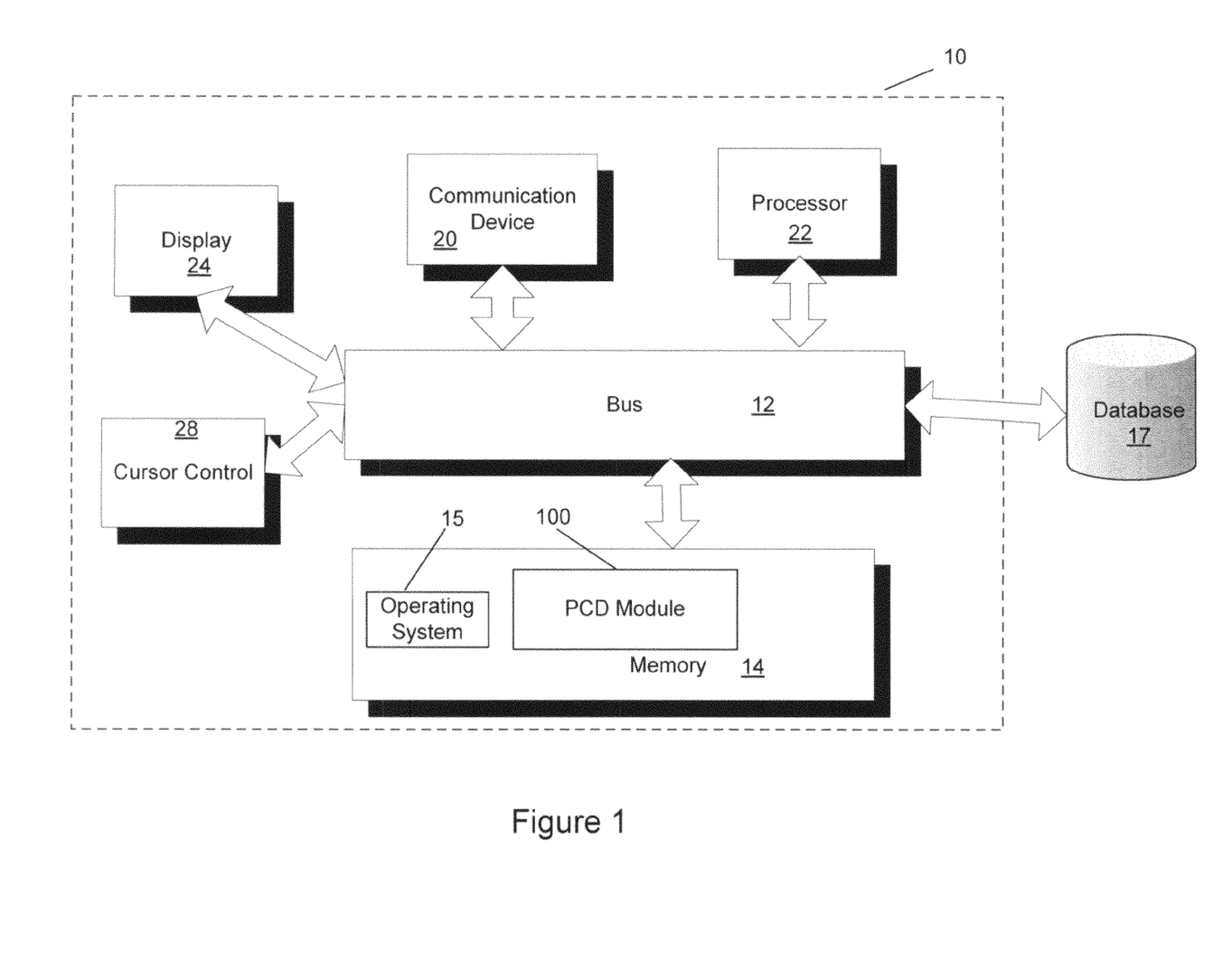
FIG. 1 is a block diagram of a system that can implement a personalized content delivery ("PCD") system in accordance with an embodiment.

FIG. 1 is a block diagram of a system 10 that can implement an embodiment of a PCD system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"), for displaying information to a user. A cursor control device 28, such as a touch screen, is further coupled to bus 12 to enable a user to interface with system 10. In one embodiment, system 10 is a tablet PC.

In one embodiment, memory 14 stores software modules that provide functionality when executed by processor 22. The modules include an operating system 15 that provides operating system functionality for system 10. The modules further include a PCD module 100. This module is described in greater detail below. System 10 may further coupled to a database 17 for storing additional data.

Figure 2:
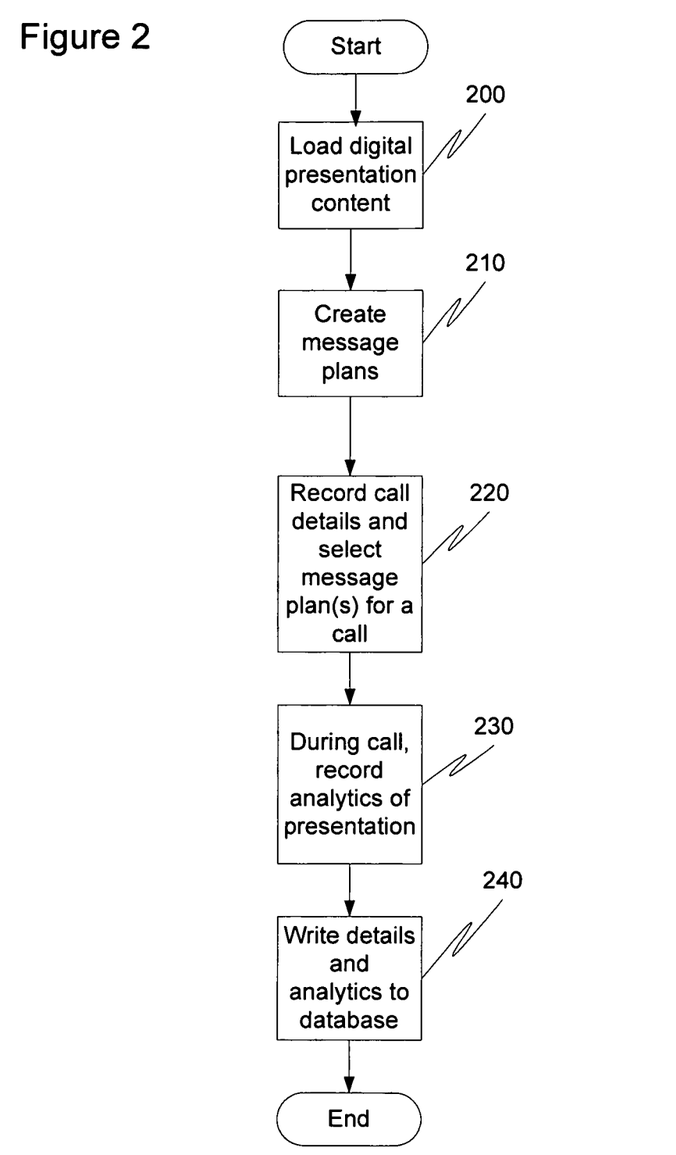
FIG. 2 illustrates a method of providing personalized content delivery and analytics in accordance with an embodiment.

FIG. 2 illustrates a flow diagram of the functionality of PCD module 100 in accordance with an embodiment. In one embodiment, the functionality of the flow diagram of FIG. 2, and FIG. 5 below, is implemented by software stored in memory and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. Initially, digital presentation content is loaded on PCD system 10 (200). Digital presentation content may be used by brand managers, marketing managers and sales operation managers as a sales communication tool for more effective communication in order to acquire, retain and develop profitable customer relationships and improve marketing and sales effectiveness. Examples of digital presentation content includes presentations in the form of Flash files, PowerPoint files, word documents, movie files, Portable Document files, etc. A "message" refers to a slide, page or segment of a presentation conveying a specific message that managers wish to track.

After loading the digital presentation content on PCD system 10, an administrator or manager may then create a "messaging plan" for the sales representative to use (210). The messaging plan is a sequence of digital presentation content used to deliver the tracked message regarding the product. When a sales representative makes a sales call, a messaging plan is selected on the PCD system 10 and details about the call are entered into the system (220). During the sales call, the PCD system 10 dynamically and automatically collects analytical data such as time spent by the sales representative on each presentation message and the sequence of the messages (230). For example, PCD system 10 may include a timer (not shown) for recording the time spent on each message or segment of the presentation.

Figure 3:
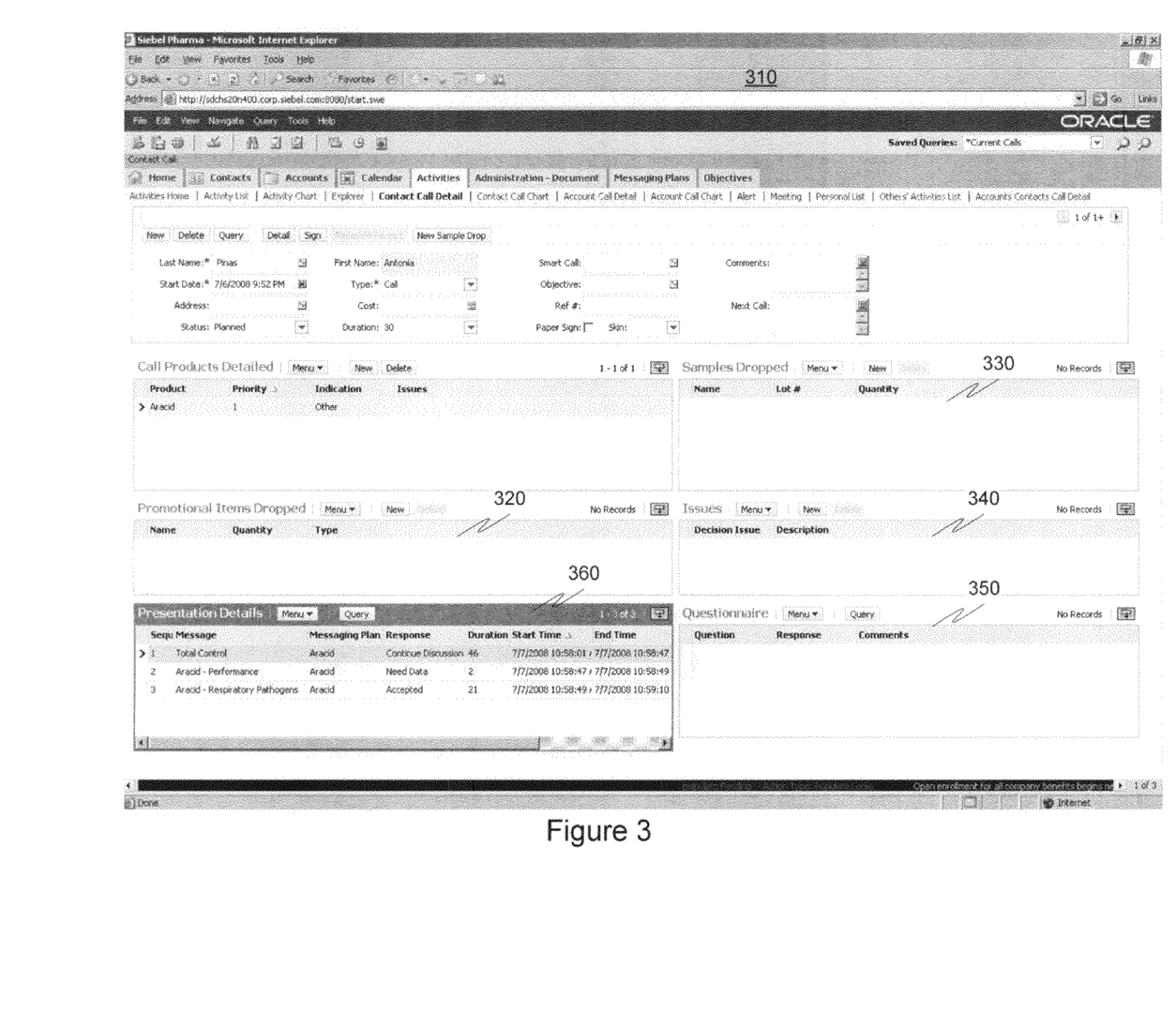
FIG. 3 illustrates example call details user interface ("UI") of the PCD system in accordance with an embodiment.

Once the sales presentation is over, the analytical data collected during the session is written back to database 17 (240). After the call, the sales representative may also enter additional details about the sales call such a samples and promotional items left with the doctor or audience, issues about the call, or questionnaires dropped during the call. FIG. 3 illustrates an example screenshot of a user interface ("UI") 310 for PCD system 10 where the sales representative can enter call details in promotional items section 320, samples dropped section 330, issues section 340, and questionnaires section 350. The screenshot UI 310 displays in presentation details section 360 the messages that were presented to the contact in the detailing session, the sequence of presented messages and their parent messaging plans (i.e., the message plan to which the messages belong), and duration of presentation of each message. Ultimately, information about the sales call and other sales calls regarding the same product may be used to develop marketing strategies for that product based on the success of the sales calls.

Figure 4A:
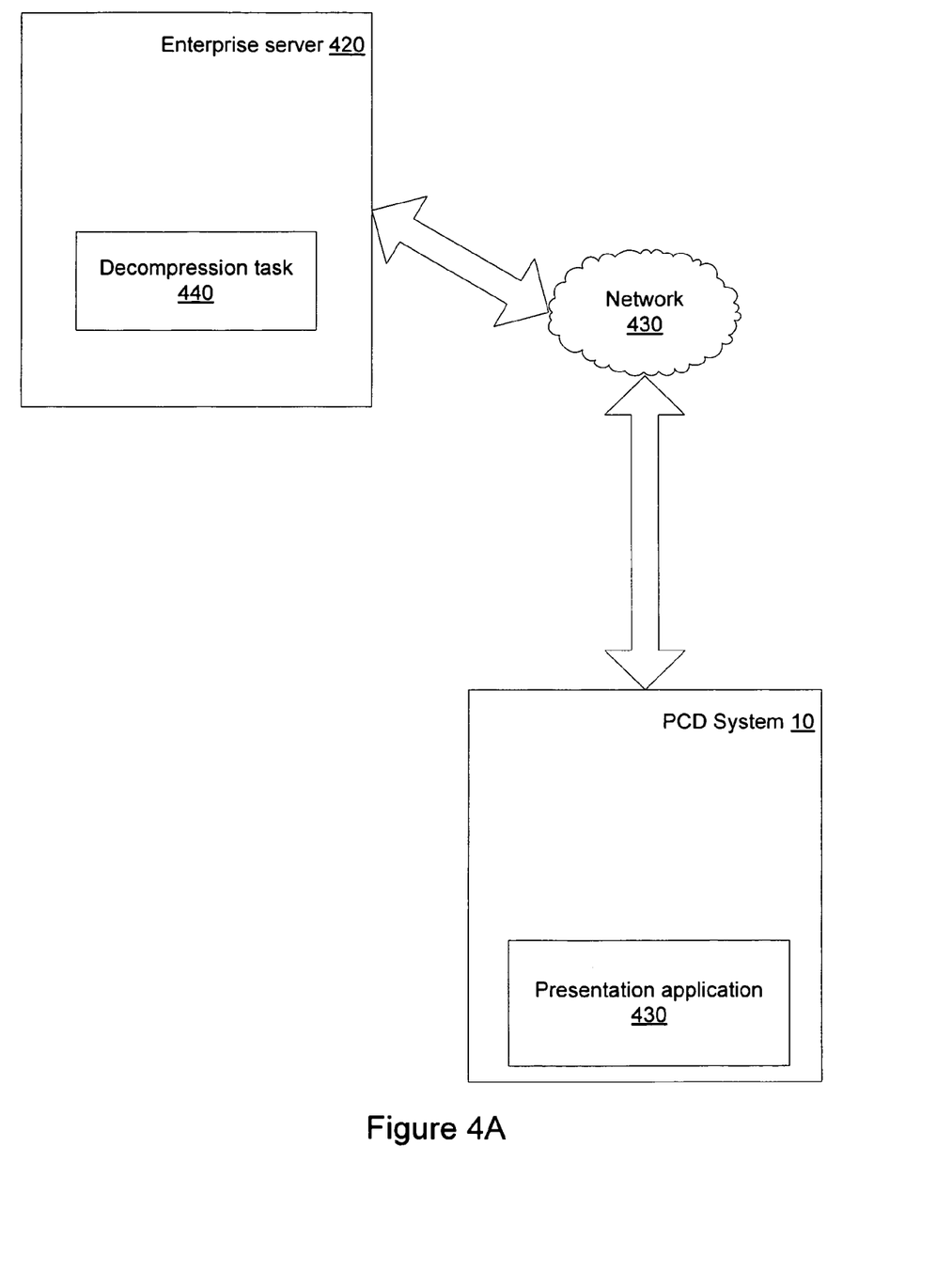
FIG. 4A illustrates a typical enterprise network.

The materials for giving a presentation, such as the messages or presentations themselves, may be stored in a compressed format on PCD system 10. To decompress the material asynchronously so that the sales representative may continue using PCD system 10, the decompression is typically spawned by an enterprise server, such as a CRM server (e.g., server running Oracle® Life Sciences). FIG. 4A illustrates a typical scenario where PCD system 10 and presentation application 410 are connected to enterprise server 420 via network 430 (e.g., the Internet). In this scenario, enterprise server 420 performs a decompression task 440. This scenario occurs in an architecture where the client natively does all actions synchronously and submits all asynchronous jobs to the server. The server adds each request to a queue and processes it as first-in, first-out ("FIFO").

Figure 4B:
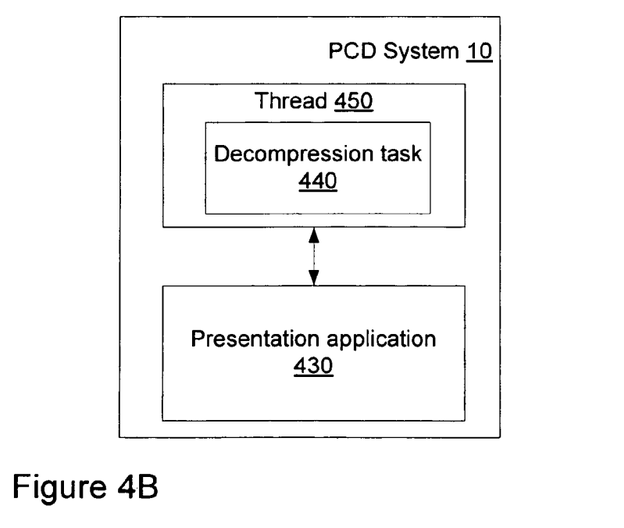
FIG. 4B illustrates a mobile client disconnected from an enterprise network in accordance with an embodiment.

However, there may be a scenario where PCD system 10 cannot connect to enterprise server 420, such as when a sales representative is on a sales call in a customer's office. FIG. 4B illustrates a scenario where PCD system 10 has determined it is not connected to enterprise server 420. Instead of making the sales representative wait for decompression task 440 to be performed synchronously by the presentation application 410, an embodiment spawns a thread 450 off of presentation application 410 to complete decompression task 440. Alternatively to decompression task 440, the asynchronous task may be any time consuming task that does not require user interaction, such as processing business flow logic or preparing reports.

Figure 5:
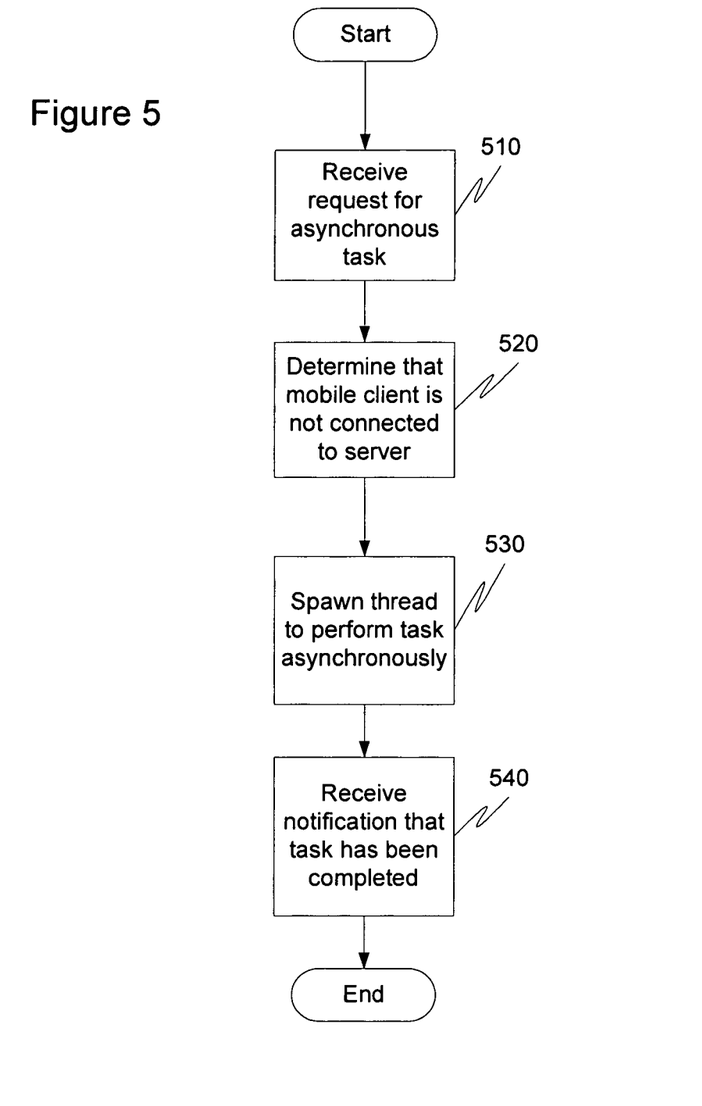
FIG. 5 illustrates a method performing a task asynchronously on a mobile client when not connected to an enterprise server in accordance with an embodiment.

FIG. 5 illustrates a method for performing an asynchronous task on a mobile client (e.g., PCD system 10) when not connected to an enterprise server, in accordance with an embodiment. The mobile client first receives a request to perform an asynchronous task, such as decompressing a data file (510). This request may be in response to a sales representative launching a presentation. The mobile client then determines that is not connected to an enterprise server to perform the task asynchronously (520). Instead, the mobile client spawns a thread to perform the task asynchronously (530). An application, such as presentation application 410, later receives a notification when the thread has finished performing the task (540).

Example code for implementing an embodiment is presented below:

```
#include <utlosd.h>
#include "physmod.h"
scfErrCode errCode = OSDCreateThread(PrepareForDecompression,
this, 0, OSD_THRD_NO_CTX, &threadId);
ccfErrCode PrepareForDecompression(void* p)
{
    CSSLSPCDSvc*   var = (CSSLSPCDSvc*)p;
    CSSModelPhysDef::SetThreadModel(var->m_pModel);
    BOOL           bDone = true;
    while(bDone)
    {
        // Do the actual tasks here( in this case: Decompress files)
        bDone = false;
    }
    return 0;
}
```

The thread model should be set explicitly, as below:
DOCHILD (m_pModel, GetBusObj (SStext("Admin Sales Tool"), pBOLitAdmin));
Since different threads may be accessing the same file, there may be synchronization conflicts. To avoid these conflicts, the files should be locked while in use, and unlocked after use, as shown in the code below:

```
#include <osdsync.h>
#include <ccfsync.h>
CCFLock m_oLock;
m_oLock.Lock( );
//Do the processing of file here
m_oLock.Unlock( );
```

The mobile client may try to create two threads simultaneously, thus synchronization is needed to create only one thread at a time. Synchronization may be ensured by creating a static variable (e.g., static BOOL m_isSyncInProgress), which would be set to TRUE as soon as the new thread is started. Since this variable is static, any further attempt to create a thread would fail by implementing the following code:

```
BOOL CSSLSPCDSvc::DoCanInvokeMethod (const SSchar*
pMethodName)
{
    ........................................
    ........................................
    else if (SSstrcmp(pMethodName,
    METHOD_CREATETHREADTODECOMPRESS)== 0)
    {
        if(m_isSyncInProgress)
            return FALSE;
        else
            return TRUE;
    }
}
```

When the thread ends after decompressing the data, the static variable is set to FALSE, allowing other users can create the thread.

Thus, a mechanism is implemented to enable a mobile client to spawn a thread to perform a task asynchronously. Accordingly, a user does not have to wait for the task to be performed synchronously when the mobile client is not connected to an enterprise server that ordinarily performs that same task.

Some embodiments of the invention have been described as computer-implemented processes. It is important to note, however, that those skilled in the art will appreciate that the mechanisms of the invention are capable of being distributed as a program product in a variety of forms. The foregoing description of example embodiments is provided for the purpose of illustrating the principles of the invention, and not in limitation thereof, since the scope of the invention is defined solely by the appended claims.

What is claimed is:

1. A method for performing an asynchronous process in a mobile client when not connected to an enterprise server, comprising:
    launching a presentation that comprises a data file stored in a compressed format, one or more messages, and a sequence of the one or more messages;
    receiving a request to perform decompression of the data file ordinarily performed by the enterprise server, in response to the launching of the presentation;
    determining the mobile client is not connected to the enterprise server;
    creating a thread from a base application to complete the decompression of the data file asynchronously utilizing a class function, wherein the class function takes a function name from which the thread starts its execution as a parameter;
    collecting analytical data on the one or more messages and the sequence of the one or more messages while the thread completes the decompression of the data file asynchronously; and
    receiving a notification that the decompression of the data file was completed by the thread.

2. The method of claim 1, wherein the enterprise server is a customer relationship management ("CRM") server.

3. The method of claim 1, wherein the mobile client is a personalized content delivery ("PCD") system.

4. The method of claim 1, wherein the base application is an applet.

5. A non-transitory computer-readable medium having instructions stored thereon that, when executed by a processor, cause the processor to perform an asynchronous process in a mobile client when not connected to an enterprise server by:
    launching a presentation that comprises a data file stored in a compressed format, one or more messages, and a sequence of the one or more messages;
    receiving a request to perform decompression of the data file ordinarily performed by the enterprise server, in response to the launching of the presentation;
    determining the mobile client is not connected to the enterprise server;
    creating a thread from a base application to complete the decompression of the data file asynchronously utilizing a class function, wherein the class function takes a function name from which the thread starts its execution as a parameter;
    collecting analytical data on the one or more messages and the sequence of the one or more messages while the thread completes the decompression of the data file asynchronously; and
    receiving a notification that the decompression of the data file was completed by the thread.

6. The non-transitory computer-readable medium of claim 5, wherein the enterprise server is a customer relationship management ("CRM") server.

7. The non-transitory computer-readable medium of claim 5, wherein the mobile client is a personalized content delivery ("PCD") system.

8. The non-transitory computer-readable medium of claim 5, wherein the base application is an applet.

9. A system for performing an asynchronous process in a mobile client when not connected to a customer relationship management ("CRM") server, comprising:
    a processor;
    an application running on the mobile client; and
    a thread for performing data decompression of a data file asynchronously of the application, wherein the application creates the thread in response to a launching of a presentation that comprises the data file, one or more messages, and a sequence of the one or more messages after determining that the mobile client is not connected to the CRM server utilizing a class function, wherein the class function takes a function name from which the thread starts its execution as a parameter;
    wherein the application is also configured to collect analytical data on the one or more messages and the sequence of the one or more messages while the thread performs the decompression of the data file asynchronously.

10. A system for performing an asynchronous process in a mobile client when not connected to an enterprise server, comprising:
    means for launching a presentation that comprises a data file stored in a compressed format, one or more messages, and a sequence of the one or more messages;
    means for receiving a request to perform decompression of the data file ordinarily performed by the enterprise server, in response to the launching of the presentation;
    means for determining the mobile client is not connected to the enterprise server;
    means for creating a thread from a base application to complete the decompression of the data file asynchronously utilizing a class function, wherein the class function takes a function name from which the thread starts its execution as a parameter;
    means for collecting analytical data on the one or more messages and the sequence of the one or more messages while the thread completes the decompression of the data file asynchronously; and means for receiving a notification that the decompression of the data file was completed by the thread.

11. The system of claim 9, wherein the mobile client is a personalized content delivery ("PCD") system.

12. The system of claim 9, wherein the application is an applet.

13. The system of claim 10, wherein the enterprise server is a customer relationship management ("CRM") server.

14. The system of claim 10, wherein the mobile client is a personalized content delivery ("PCD") system.

15. The system of claim 10, wherein the base application is an applet.

* * * * *

UNITED STATES PATENT AND TRADEMARK OFFICE
CERTIFICATE OF CORRECTION

PATENT NO. : 8,762,448 B2
APPLICATION NO. : 12/363371
DATED : June 24, 2014
INVENTOR(S) : Kumar et al.

It is certified that error appears in the above-identified patent and that said Letters Patent is hereby corrected as shown below:

On title page, column 2, item [57] under Abstract, line 1, after "provided" insert -- to --.

On title page 2, column 2, References Cited under Other Publications, line 8, delete "Oracel" and insert -- Oracle --, therefor.

On title page 2, column 2, References Cited under Other Publications, line 9, delete "Inglhein" and insert -- Inglheim --, therefor.

Signed and Sealed this
Twenty-fourth Day of February, 2015

Michelle K. Lee
*Deputy Director of the United States Patent and Trademark Office*